Patented Sept. 15, 1953

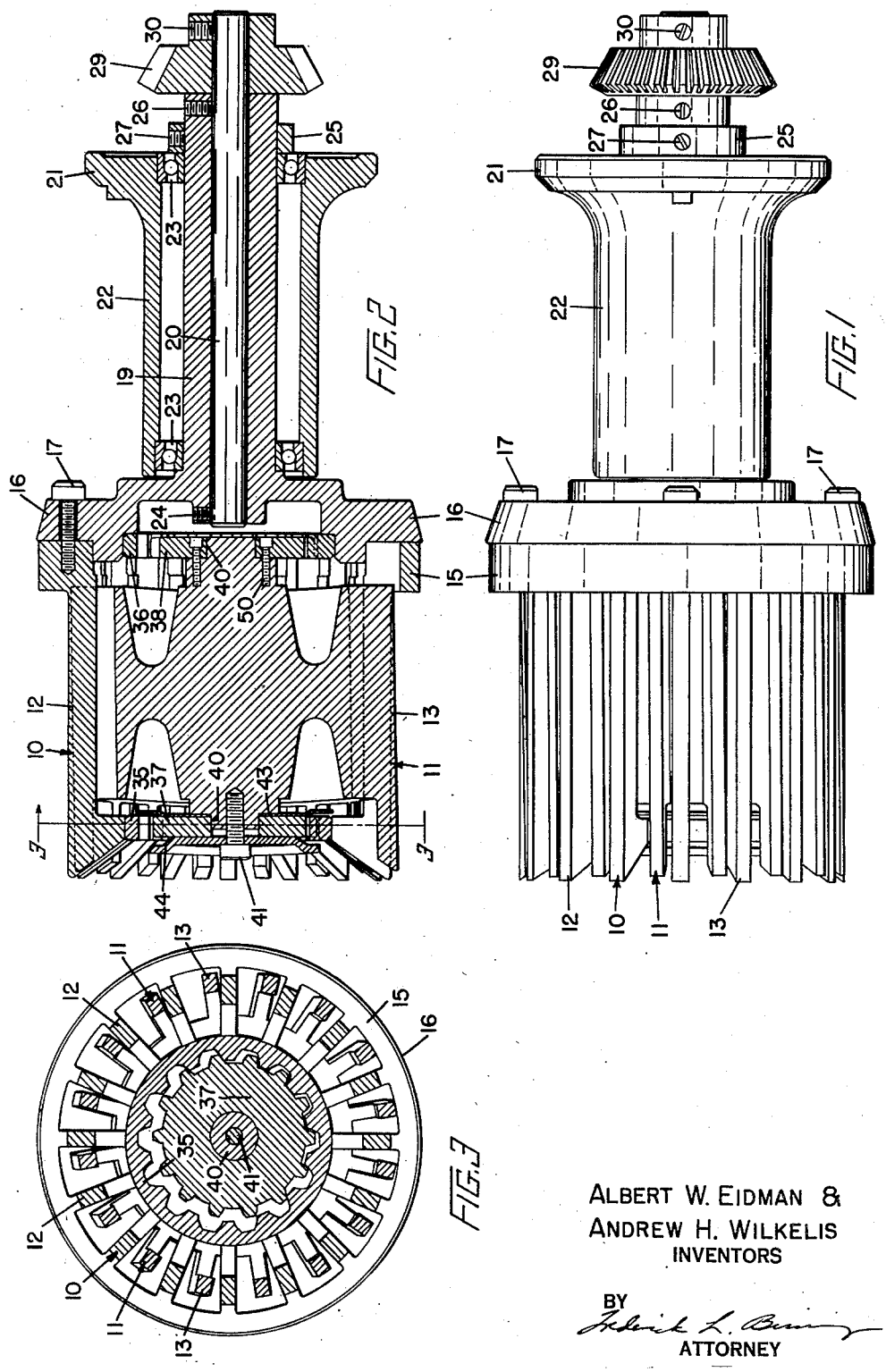

2,651,828

UNITED STATES PATENT OFFICE 2,651,828

THREAD ADVANCING REEL

Albert W. Eidman, South Euclid, and Andrew H. Wilkelis, Cleveland, Ohio, assignors to Industrial Rayon Corporation, Cleveland, Ohio, a corporation of Delaware Application January 23, 1948, Serial No. 3,988

10 Claims. (Cl. 28—71.7)

This invention relates to thread or the like advancing reels. More particularly this invention relates to a two-member reel wherein one of the reel members comprising the reel is gravitationally positioned therein, cooperating with the other reel member to advance thread over the reel in a plurality of generally helical turns.

The reel of this invention advantageously embodies the principle disclosed in the Knebusch Patent No. 2,210,914. As therein disclosed the two reel members comprising the reel rotate on individual axes which are offset and askew to each other. Each reel member has a periphery of a plurality of spaced, longitudinally extending bar members. The bars are arranged in an interdigitating manner; and since they are adapted to rotate about offset and askew axes the thread or the like is caused to advance in generally helical turns.

Generally, reels operating on the above principle have their reel members mounted on a supporting shaft; each reel member, however, rotates about an individual fixed support having an axis that is offset and askew to the other reel member axis. The reel of this invention advantageously eliminates a fixed support for one of the reel members. One of the reel members is adapted to "float" within the other occupying substantially the same position at all times. Further, the reel member is adapted to be gravitationally positioned in the other reel member, and to freely rotate within annular guides such as gears or rings. Complementary supporting gears or discs are attached to the floating reel member, and ride or rotate in the annular gears or rings which serve as guides or tracks. The conjugate gear sets or rings are arranged to provide the floating reel member with an axis that is offset and askew to the axis of the other reel member. Being gravitationally positioned the bar members of the floating reel member will protrude beyond the bar members of the other reel member over substantially the lower half of the circumference of the reel. These bar members will be contained within the bar members in the upper half of the other reel circumference.

Further, the annular gears or rings are advantageously attached to the concentrically mounted reel member and they are positioned therein in a manner so that with the complementary supporting gears the axis of rotation of the floating reel is offset and askew to the axis of the concentric reel member. Such a construction lends itself advantageously to a cantilever type of support of only one of the reel members.

The reel of this invention will be described in greater detail in the accompanying description and drawing, where:

Figure 1 represents the reel of this invention in plan;

Figure 2 represents the reel in section; and

Figure 3 is a cross-section of the reel of Figure 2 taken along line 3—3.

Referring to the drawing the reel comprises two reel members 10 and 11. Each reel member 10, 11 has a periphery formed of a plurality of bar members 12 and 13 respectively, spaced and arranged in a circumferential manner about their axes. As shown, the longitudinally extending bar members 12 of reel member 10 are interleaved with the bar members 13 of reel member 11 to form a single reel periphery.

The bar members 12 of the reel member 10 merge at one end into a flange 15 which is secured by means of bolts 17 to a flange 16. There is attached to the flange 16 a longitudinally extending sleeve 19 through which extends a shaft 20 which supports the reel. The sleeve 19 is secured to the reel shaft 20 by means of set screws 24 and 26; set screw 24 is threaded through a boss at one end of the sleeve 19 while the set screw 26 is threaded through the other end of the sleeve itself. The set screws also secure the sleeve against lateral displacement on the reel shaft 20.

About the sleeve 19 there are mounted antifriction bearings 23. On these bearings 23 there is positioned the reel supporting sleeve 22. The sleeve 22 itself is maintained in position by the collar 25 abutting the bearing 23, and which collar is secured to the inner sleeve 19 by the set screw 27. Further, the sleeve 22 is flared at one end to provide for a support 21 so that the reel may thereby be positioned and supported in the face of a spinning machine (not shown) and thus advantageously provide a cantilever type support.

The reel is driven by a rotation of the shaft 20. A driving gear 29 is mounted on one end of the reel shaft on the portion that extends beyond the sleeve 19. Further, the driving gear 29 is secured to the shaft 20 by means of a set screw 30 that is threaded through its hub portion.

Within the supported reel member 10 there are positioned annular gears 35, 36 serving as guides or tracks for the floating reel member 11. Complementary inner gears 37, 38 ride in the annular gears 35, 36 and provide support for the reel member 11. They are attached to the reel member 11 at its hub ends 40. The complementary gear 37 is attached to the hub 40 at one end, while gear 38 is attached to the hub 40 at the other end of the reel member 11. The conjugate gear sets are mounted and arranged within the reel member 10 to give the reel member 11 an axis that is offset and askew to the axis of the reel member 10. When the reel is rotated the reel member 11 will run or turn on its gears 37, 38 in the annular gears 35 and 36. The weight of the reel member 11 will position it in a downward direction, causing the bar members 13 to protrude below the bar members of reel member 10. Since the axes of the reel members are offset and askew the rotating reel members will effect an angular displacement of thread from the one set of bar members to the other and thus cause an advance of thread over the reel periphery. Instead of the running gears, ring type guides and discs can be used if it is so desired.

Since reel member 11 is gravitationally positioned within the reel member 10 it can be displaced by the tension in the thread when it is greater than the weight of the reel member. Should such a condition occur the thread would not be advanced inasmuch as the offset relationship between the two reel members would be destroyed. To prevent this from taking place the floating reel member 11 should be weighted so as to overcome the tension in the thread. Should a limit in tension be reached then the tension in the thread will overcome the weight of the reel member and thus prevent an advance of thread. The particular instance when such an occurrence took place would be observable since there would be no thread advancement over the reel; instead, a bundle would accumulate. Thus the tension in the thread being advanced can be regulated to an extent. Of course, where the reel will be subject to a variation of yarns then its floating reel member should be accordingly compensated for in weight.

The pitch or spacing of the thread turns can, also, be readily varied. To change the pitch the angular position of either gear 35 or 37 is relocated and fixed. The angular readjustment alters the skewness of the floating reel and therefore the pitch or spacing of the thread turns. The adjustment is generally made by removing the face plate 44 and rotating the gear 37.

Thrust plates are provided on either side of the complementary set of forward gears 35, 37 to prevent the displacement of the floating reel member 11. On the forward end of the reel member 11 and outside of the complementary set of gears there is positioned an end plate 44, and a companion plate 43 is secured on the inside of the gears. The end plates 43, 44 are secured to the hub 40 by a screw 41 externally threaded into the hub 40. The reel member supporting gear 37 is also held in position by the screw 41. The rear supporting gear 38 is fastened to the hub 40 by screws 50.

While the reel of this invention is disclosed as a cantilever type reel obviously it can be modified to have a support at its forward end. The bar members 12 of the concentric reel member 10 can merge into a ring or a flange, such as flange 15, and be thereby supported by an associated mechanism well known in the art. The function of the reel will be the same as that described.

We claim:
1. A thread-advancing reel comprising two reel members each having a periphery of a plurality of circumferentially spaced bar members, the bar members of both reel members being interleaved, one of said reel members being hollow, and the other of said reel members being rotatable about a substantially freely movable axis and gravitationally positioned substantially within the hollow reel member.

2. A thread-advancing reel comprising, a hollow supported reel member having a discontinuous circular periphery of a plurality of circumferentially spaced bar members, and a second reel member having a similar plurality of circumferentially spaced bar members, said second reel member being rotatable about a substantially freely movable axis and gravitationally positioned substantially within said hollow reel member, its bar members protruding below the periphery of said hollow reel member.

3. A thread-advancing reel comprising, a cantilever support, a hollow reel member having a discontinuous circular periphery composed of a plurality of circumferentially spaced bar members attached to said support, and a second reel member having a discontinuous circular periphery of a plurality of spaced bar members rotatable about a substantially freely movable axis and gravitationally positioned substantially within said hollow reel member with its bar members interdigitating with the bar members of said hollow reel member and protruding below those of said hollow reel member.

4. A thread-advancing reel of the character described in claim 3 in which said hollow reel member has supporting guiding means for the gravitationally positioned second reel member.

5. A thread-advancing reel of the character described in claim 3 in which the second gravitationally positioned reel member rotates with said hollow reel member on an axis that is eccentric to the axis of said hollow reel member.

6. A thread-advancing reel of the character described in claim 3 in which the gravitationally positioned reel member rotates on an axis that is offset and askew to the axis of said hollow reel member.

7. A thread-advancing reel comprising, a cantilever support, a hollow reel member having a periphery of a plurality of circumferentially spaced bar members attached to said cantilever support, a second reel member positioned in said hollow reel member, spaced annular guiding means positioned within said first reel member for supporting said second reel member and arranged so that the second reel member axis is offset and askew to the axis of the first reel member, said second reel member having a periphery of a plurality of circumferentially spaced bar members being adapted to be rotated in said guiding means, the bar members of the two reel members being in an interdigitating relation, and said second reel member being gravitationally positioned substantially within said guiding means.

8. A thread-advancing reel comprising, a cantilever support, a hollow reel member having a periphery of a plurality of circumferentially spaced bar members attached to said cantilever support, spaced annular gears positioned in said hollow reel member, a second reel member having a plurality of circumferentially spaced bar members said second bar members interdigitating with the bar members of said first reel member, spaced supporting gears attached to said second reel member and positioned in meshing relation in said spaced annular gears, said second reel member being gravitationally positioned by said supporting gears in said annular gears, and one of said gears attached to said second reel member being angularly adjustable.

9. A thread-advancing reel comprising two reel members each having a periphery of a plurality of circumferentially spaced bar members, the bar members of both reel members being interleaved, one of said reel members being hollow and being rotatable above a fixed axis, the other of said reel members being positioned at least partially within the hollow reel member, said other reel member being rotatable about a substantially freely movable axis eccentric to said fixed axis and within said hollow reel member and being normally biassed by gravity to assume a position substantially vertically below said fixed axis.

10. A thread-advancing reel comprising two reel members each having a periphery of a plurality of circumferentially spaced bars, the bars of both reel members being interleaved, each of the reel members being positioned at least partially within the periphery of the other reel member, one of said reel members being rotatable about a fixed axis, means for floatingly mounting the other reel member with respect to the first-mentioned reel member on an axis of rotation which is eccentric to and movable about said fixed axis comprising a pair of axially spaced annular bearing elements mounted on the first-mentioned reel member and a pair of axially spaced annular bearing elements on the other reel member, each of the latter elements being eccentrically mounted with respect to the first-mentioned bearing elements, each of the elements of one pair having an internal bearing surface and each of the elements of the other pair having an external bearing surface, each of said surfaces having a cross-section that is a circle, said other reel member being normally biassed by gravity to assume a position during operation in which the movable axis is substantially vertically below said fixed axis.

ALBERT W. EIDMAN.
ANDREW H. WILKELIS.

References Cited in the file of this patent

UNITED STATES PATENTS

| Number | Name | Date |
|---|---|---|
| 2,255,017 | Torrence et al. | Sept. 2, 1941 |
| 2,294,866 | Bergmann | Sept. 1, 1942 |

FOREIGN PATENTS

| Number | Country | Date |
|---|---|---|
| 253,371 | Germany | Nov. 6, 1912 |